Sept. 20, 1949.  B. TOWNE  2,482,227
EDUCATIONAL GAME
Filed Nov. 20, 1944
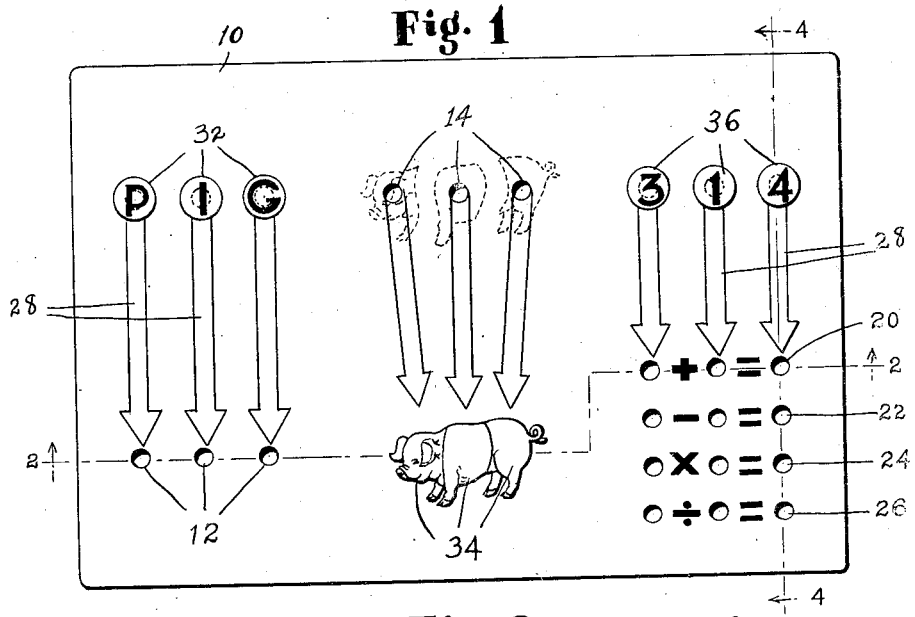
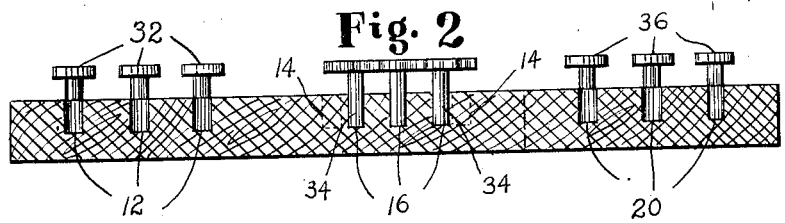
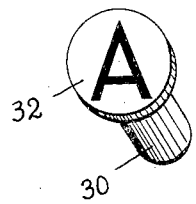
Fig. 3
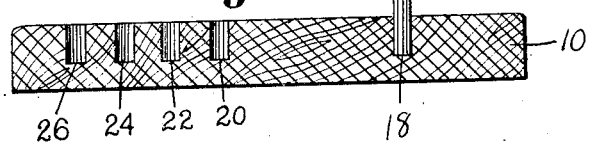
Inventor
Benjamin Towne.

Patented Sept. 20, 1949

2,482,227

UNITED STATES PATENT OFFICE 2,482,227

EDUCATIONAL GAME

Benjamin Towne, New York, N. Y.

Application November 20, 1944, Serial No. 564,251

3 Claims. (Cl. 35—35)

This invention appertains to an educational game, and has for one of its several objects to provide a type thereof to be employed in teaching extremely young children the elements of certain subjects of learning in an interesting and a more or less amusing manner, either in the home or in the classroom.

Another object of the invention has to do with the provision of a plane surface having perforations for the orderly emplacement of game pieces in the same, the game pieces being marked for identification and proper selection for play.

A further object of the invention is to provide a game and game pieces of this kind, wherein the plane surface has at least three divisions of play, each division being provided with two or more parallel groups or rows of perforations in which the play pieces are to be selectively emplaced in a related or matching order.

Another object of the invention lies in the provision of the game and game pieces as thus constructed and arranged, wherein one of said divisions of the plane surface is allotted, for instance, for the emplacement in its perforations of game pieces individually identified with letters of the alphabet for the learning and teaching of word formation or spelling; the second of said divisions for the emplacement in its perforations of game pieces individually identified with matchable parts of certain members of the animal kingdom for the learning and teaching of their names and identity; and another of said divisions for the emplacement in its perforations of game pieces individually identified with numerals for the learning and teaching of arithmetic, i. e., addition, subtraction, multiplication, and division.

Yet another object of the invention is to provide a perforated plane surface which may take the form of a board to be laid on a flat support, such as a table or the like; supported on a wall, or on an easel or stand; made in the form of a table top, such as the top of a bridge table or the like; or in book form, with each of the aforesaid divisions of perforations formed in a leaf.

With these and other objects and advantages in view, the invention resides in the certain new and useful combination, construction, and arrangement of parts, as will be hereinafter more fully described, set forth in the appended claims, and illustrated in the accompanying drawings, in which:

Figure 1 is a top plan view of a game board and certain of the game pieces, in accordance with the invention;

Figure 2 is a vertical longitudinal section, taken through the line 2—2 on Figure 1, looking in the direction of the arrows;

Figure 3 is a perspective view of one of the game pieces per se; and

Figure 4 is a vertical transverse section, taken through the line 4—4 on Figure 1.

Referring to the drawing, wherein like characters of reference denote corresponding parts in the several views, the invention, as it is exemplified therein, is comprised in a plane surface 10, which may be constructed of wood, composition or solid, or of any other suitable sheet material. As shown in Figure 1, the top surface of the board is formed with a plurality of perforations or recesses that are arranged in three divisions or groups; the left hand division or group consisting of two parallel rows of three perforations or recesses 12 each; the central division or group consisting of two parallel rows of three perforations or recesses 14, 16, with the perforations or recesses 14 of the upper row spaced a slightly greater distance apart than the perforations or recesses 16 of the lower row; and the right hand division or group consisting of five parallel rows of three perforations or recesses each, the latter being designated 18, 20, 22, 24, and 26, respectively, reading downward from the top edge of the board, the row of perforations or recesses 18 being arranged toward the top edge of the surface or board 10, and the other rows in a closely arranged group, of horizontal and vertical rows toward the bottom edge thereof. The perforations or recesses of these five parallel rows are arranged in vertical alignment, as are those of the two rows of the first or left hand division or group, and the spaces between the perforations or recesses 20, 22, 24, and 26, of the left hand and the central vertical rows thereof are marked with the mathematical signs + (plus); — (minus); × (multiplication); and ÷ (division), respectively, while the corresponding spaces between the perforations or recesses of the central and right hand rows are each marked with the = (equal) sign. Direction arrows 28 are provided to extend between the perforations or recesses of the upper rows of each of the divisions or groups thereof and the corresponding perforations or recesses of the rows below the same.

With the plane surface or board 10 as thus constructed and arranged, and as above stated, a number of game pieces are to be employed and, as shown in Figure 3, each of them generally is in the form of a peg or pin 30 that has a flat head 32 upon which a letter, a numeral, or a matchable part of a member of the animal kingdom are marked or pictured. For use with the left hand division of the plane surface or board 10, game pieces representing all of the letters of the alphabet are provided for the formation of words, i. e., three letter words if but three perforations or recesses are provided in the rows of that division. For the central division, the game pieces, designated 34, will be pictured with the fore, middle and hind parts of an animal, while the right hand division will be played with game pieces, designated 36, marked with the numerals. The game pieces 34, for the central division, however, may be pictured with matchable parts of other subjects, e. g., human, plant, factual or fiction. Also, the number of perforations or recesses in each of the divisions, particularly those of the first two divisions, may be other than three in each row, so that names or words of more than three letters can be learned or taught.

For the purpose of covering the entire alphabet, sixteen words have been selected to that end, namely, ox; cat; bear; cow; buffalo; lamb; zebra; donkey; deer; man; pig; hen; horse; vireo; quail; and bluejay, and a requisite number of the game pieces 34 will be provided with pictorial representations of matchable parts of the same on the heads 32 of the pegs or pins 30. Thus, if a pig is selected for study, game pieces 34, one having the head portion, another the middle portion, and a third the hind portion, will first be emplaced in the upper row of perforations or recesses 14, of the central division, and thereafter will be transferred to the lower row of perforations or recesses 16, where they will be matched up in edge to edge contact to picture the complete animal. Likewise, game pieces 32 bearing the letters spelling the name "pig" will be picked out from among others and emplaced in the upper row of the perforations or recesses 12 and later transferred to the lower row thereof, so as to be in line with the completed picture of the animal.

In the use of the right hand division of the plane surface or board 10, game pieces 36, bearing numerals, will be selected for the performance of a required example in arithmetic and these will be emplaced in the upper row of perforations or recesses 18 and thereafter transferred to one or the other of the rows of perforations or recesses 20, 22, 24, or 26, depending upon whether the example is one of addition, subtraction, multiplication, or division.

Without further description, it is thought that the merits of the disclosed means for the instruction of children of all ages will be appreciated by all of those persons interested in time saving methods of education and teaching, particularly since it will catch and hold the attention of younger children, especially those of infants of kindergarten age, by reason of it requiring the use of the hands along with the sight and brain powers, making it a combination of play as well as of instruction. Also, it will be obvious to such persons that an older child may replace the qualified teacher in imparting to the younger child, the fundamentals of spelling and of arithmetic, especially in the home for the relief of parents for the performance of their manifold family duties. For older children, the number of vertical rows of the perforations or recesses may be increased for the teaching of more complex subjects, i. e., spelling, object parts for matching, and numbers. The board and play pieces may also find use in a testing procedure, for ascertaining the I. Q., or progressive learning of a child.

Having thus fully described a preferred embodiment of my invention, it is to be understood that any and all changes in design, construction, and arrangement of its parts, may be resorted to, provided that such changes fall within the scope of the appended claims.

I claim:

1. An educational game comprising a board presenting a top plane surface, there being a plurality of perforations in said surface, said perforations being arranged in divisions, each of the divisions being spaced from each other and comprising parallel rows, each row having an equal number of perforations arranged in aligned relation and equally spaced from each other, a plurality of game pieces, each having a peg for insertion in a perforation of one of the rows and a head, each head bearing indicia symbolic of an educational operation on its top surface, a game piece being mounted upon each of the perforations of one of said rows, the respective game pieces being so selected that the indicia on the heads form together an educational operation, and a plurality of arrows equal in number to the perforations in a row of said one division and pointing from the one row of said divisions to the other row thereof.

2. An educational game comprising a board presenting a top plane surface, there being a plurality of perforations in said surface, said perforations being arranged in a plurality of divisions, each of the divisions being spaced from each other, one of said divisions comprising a pair of parallel rows, each row having an equal number of perforations arranged in aligned relation and equally spaced from each other, a plurality of game pieces each having a peg for insertion in a perforation of one of the rows and a head, each head bearing a letter on its top surface, a game piece being mounted upon each of the perforations of one of said rows, the respective game pieces being so selected that the letters on the heads form together a word, the peg of each of the respective game pieces being received within a perforation of said one of the rows, another of said divisions comprising a pair of parallel rows each having an equal number of perforations arranged in spaced and aligned relation, the perforations of one of the rows of said another division being spaced from each other a slightly greater distance than the perforations of the other of the rows of said another division, another plurality of game pieces each having a peg for insertion in a perforation of one of the rows of said another division and a head, each head forming a part of an article, one of said another game pieces being mounted upon each of the perforations of one of the rows of said another division, the respective game pieces of said another game pieces being so selected that the parts on the heads form together the representation of such article, the peg of each of the last-named respective game pieces being received within a perforation of said one of the rows of said another division, and a plurality of arrows equal in number to the perforations in a row of each of said one and another division pointing from the one row of each division to the other row thereof.

3. An educational game comprising a board presenting a top plane surface, there being a plurality of perforations in said surface, said perforations being arranged in a division, the division comprising a first row of perforations arranged in aligned relation and equally spaced from each other, arrows pointing from each perforation of said row, a plurality of additional rows of perforations, said latter rows being arranged at successively increasing distances from the points of said arrows, the corresponding perforations of each of the latter rows being aligned with the point of an arrow, the spaces between the perforations of each of the latter rows bearing indicia symbolic of arithmetical operations, and a plurality of game pieces each having a peg for insertion in a perforation of one of the respective rows and a head, each head bearing a numeral on its top surface, a game piece being mounted upon each of the perforations of one of said rows, the respective game pieces being so selected that the numerals on the heads form together a specified number for an arithmetical operation, the peg of each of said game pieces being received within a perforation of one of the respective rows.

BENJAMIN TOWNE.

REFERENCES CITED

The following references are of record in the file of this patent:

UNITED STATES PATENTS

| Number | Name | Date |
|---|---|---|
| 462,997 | Rowland | Nov. 10, 1891 |
| 556,467 | Koerner | Mar. 17, 1896 |
| 777,268 | Thompson | Dec. 13, 1904 |
| 1,230,263 | Alexander | June 19, 1917 |
| 1,406,592 | Watkins | Feb. 14, 1922 |
| 1,593,686 | Barnes | July 27, 1926 |
| 1,815,443 | Mitchell | July 21, 1931 |
| 2,129,834 | Funk | Sept. 13, 1938 |
| 2,213,411 | Rippon | Sept. 3, 1940 |
| 2,361,154 | Schoolfield | Oct. 24, 1944 |